United States Patent
Ruohonen

(12) 
(10) Patent No.: US 6,377,803 B1
(45) Date of Patent: Apr. 23, 2002

(54) NEIGHBOUR CELL MEASUREMENTS FOR CELL RE-SELECTION

(75) Inventor: Jari Ruohonen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/385,109

(22) Filed: Aug. 27, 1999

(30) Foreign Application Priority Data

Aug. 28, 1998 (FI) .................................................. 981855

(51) Int. Cl.$^7$ ................................................. H04Q 7/20
(52) U.S. Cl. ........................ 455/434; 455/343; 455/437; 455/515
(58) Field of Search ................................ 455/343, 434, 455/437, 515, 574, 422, 575, 67.1; 370/252, 528, 336, 337, 347

(56) References Cited

U.S. PATENT DOCUMENTS

| | | | |
|---|---|---|---|
| 5,257,257 A | 10/1993 | Chen et al. ..................... 370/18 |
| 5,519,711 A | * 5/1996 | Sointula ....................... 455/343 |
| 5,565,821 A | 10/1996 | Murtojarvi .............. 331/117 D |
| 5,574,996 A | 11/1996 | Raith ....................... 455/161.3 |
| 5,640,395 A | 6/1997 | Hamalainen et al. ....... 370/322 |
| 5,729,534 A | 3/1998 | Jokinen et al. ............. 370/280 |
| 5,729,541 A | 3/1998 | Hamalainen et al. ....... 370/337 |
| 5,790,534 A | 8/1998 | Kokko et al. ............... 370/335 |
| 5,794,157 A | * 8/1998 | Haartsen ...................... 455/422 |
| 5,802,465 A | 9/1998 | Hamalainen et al. ....... 455/403 |
| 5,883,885 A | 3/1999 | Raith ........................... 370/311 |
| 5,930,710 A | 7/1999 | Sawyer et al. .............. 455/436 |
| 5,966,670 A | * 10/1999 | Keskitalo et al. ........... 455/434 |
| 5,974,320 A | * 10/1999 | Ward et al. ................. 455/437 |
| 6,018,661 A | * 1/2000 | Raith et al. ................. 455/437 |
| 6,044,270 A | * 3/2000 | Raith ........................... 455/434 |

FOREIGN PATENT DOCUMENTS

| | | |
|---|---|---|
| EP | 0 812 119 A2 | 12/1997 |
| WO | WO 95/12932 | 5/1995 |
| WO | WO 98/38819 | 9/1998 |

OTHER PUBLICATIONS

Digital cellular telecommunications system (Phase 2+); General Packet Radio Service (GPRS); Service Description; Stage 2 (GSM 03.60 version 6.2.0 Release 1997).

ETS 300 911 Digital cellular telecommunications system (Phase 2+); Radio subsystem link control (GSM 05.08 version 5.7.0).

Finnish Office Action.

* cited by examiner

*Primary Examiner*—Nay Maung
*Assistant Examiner*—Quochien B. Vuong
(74) *Attorney, Agent, or Firm*—Perman & Green, LLP

(57) ABSTRACT

The invention concerns a mobile station and a method of controlling cell idle-mode re-selection measurements in a mobile station in a mobile communication system comprising base stations where a base station defines a cell, and a mobile station for communicating with at least one base station, in which method when the mobile station is in idle mode, the mobile station monitors paging messages coming from the base station informing the mobile station of possible transmissions to come, the paging messages arrive at certain intervals, the interval defining a discontinuous reception period (DRX period), and further in idle mode the mobile station (MS) performs cell re-selection measurements on certain channels. The number of cell re-selection measurements (Proposal) is proportional to the length of the DRX period, whereby during a longer DRX period a higher number of cell re-selection measurements is performed than during a shorter DRX period.

11 Claims, 13 Drawing Sheets

NEIGHBOUR CELL MEASUREMENTS FOR CELL RE-SELECTION

FIELD OF THE INVENTION

The present invention relates to packet switched radio telephone services and is applicable in particular, though not necessarily, to the General Packet Radio Service (GPRS). Moreover, the invention concerns idle-mode cell re-selection measurements in GPRS.

BACKGROUND OF THE INVENTION

Current digital cellular telephone systems such as GSM (Global System for Mobile communications) were designed with an emphasis on voice communications. Data is normally transmitted between a mobile station (MS) and a base station subsystem (BSS) over the air interface using the so called "circuit switched" transmission mode in which a series of regularly spaced time slots on one frequency band are reserved for the duration of the call. For voice communications, where the stream of information to be transmitted is relatively continuous, the circuit switched transmission mode is reasonably efficient. However, during data calls, e.g., internet access or facsimile transmission, the data stream is "bursty" and the long term reservation of time slots in the circuit switched mode represents an uneconomic use of the air interface.

Given that the demand for data services with digital cellular telephone systems is increasing rapidly, a new GSM based service known as the General Packet Radio Service (GPRS) is currently being standardised by the European Telecommunications Standards Institute (ETSI) and is defined in overall terms in recommendation GSM 03.60. GPRS provides for the dynamic allocation of transmission capacity for data transmission. That is to say that time slots on a frequency band (or bands) are allocated to a particular MS to BSS link only when there is data to be transmitted. The unnecessary reservation of time slots when there is no data to be transmitted is avoided.

GPRS is intended to operate in conjunction with conventional GSM circuit switched transmission to efficiently use the air interface for both data and voice communications. GPRS will therefore uses a basic channel structure similar to hat defined for GSM. In GPRS, a given frequency band is divided in the time domain into multi-frames, each multi-frame consisting in turn of 52 TDMA (Time Division Multiple Access) frames. The length of a TDMA frame is 4.615 ms and each TDMA frame is in turn divided into eight consecutive slots of equal duration. This frame structure is illustrated in FIG. 1 and is relative to the transmission and reception time at the BSS.

In the conventional circuit switched transmission mode, when a call is initiated, two physical channels are defined for that call at the BSS by reserving two respective time slots, separated by two intervening slots, in each of a succession of TDMA frames. One of these channels provides a downlink channel for carrying user data from the BSS to the MS whilst the other provides the uplink channel for carrying user data from the MS to the BSS.

With the introduction of GPRS (the general architecture of a GSM/GPRS network is illustrated in FIG. 2) the fixed relationship between time slots allocated for uplink and downlink channels no longer applies. Time slots may be dynamically assigned to the uplink channel and the downlink channel for a given MS depending upon demand and capacity and MS multi-slot class. So, for example, in any given TDMA frame one time slot may be allocated to the downlink channel with two slots being allocated to the uplink channel. Also, there is no fixed time relationship between the uplink and the downlink allocated slots. Slot allocation is notified to the MS during a channel set-up stage.

There is illustrated in FIG. 3 a cell 1 of a cellular mobile telephone network. A mobile station (or telephone) 2 located within the cell 1 communicates with a base station (BS) 3 of the cell. As has already been described above, when a call or data connection is made from the mobile station 2 (also referred to as MS) to the BS 3 or vice versa, a downlink 'channel' and an uplink 'channel' are reserved to enable bi-directional communication to take place. The MS 2 is provided with a radio frequency part RF, with reception branch RX and transmission branch TX for performing transmission and reception functions. Transmission and reception is controlled by the MCU (Master Control Unit), which controls e.g. timing of performing the different known operations of an MS. Also the MS monitors the radio conditions in the serving cell and in neighbouring cells.

When a MS first connects to a GPRS cellular network, the MS synchronises itself to the BSS using information carried by a synchronisation channel (SCH) transmitted by the BSS to all listening MSs. Also when a MS first connects to a GPRS cellular network, the MS looks for a cell suitable cell by checking cells in descending order of received signal strength. If a suitable cell is found, the MS camps on it and performs any registration necessary. Cells can have two levels of priority, suitable cells which are of low priority are only camped on if there are no other suitable cells of normal priority. This is called "cell selection". When camped on a cell the MS regularly looks to see if there is a better cell in terms of a cell re-selection criterion, and if there is, the better cell is selected. Also if one of the other criteria changes, (e.g., the current serving cell becomes barred), or there is a downlink signalling failure, a new cell is selected. This is called "cell re-selection".

Procedures for cell re-selection are specified in GSM specification 05.08. Cell—re-selection measurements are performed when the MS is in idle mode, i.e. switched on but not having a dedicated channel allocated, e.g. not making or receiving a call, or when in group receive mode, that is, receiving a group call or broadcast call but not having a dedicated connection. Basically idle-mode can also be defined as any other period, except when the MS is in transfer mode. In packet idle mode the MS has to make measurements (signal strength mesurements, power measurements) for cell re-selection in order to ensure that a mobile is camped on a cell with which it can reliably communicate on both the radio uplink and downlink.

It is currently specified for GPRS idle mode cell re-selection measurements that a mobile station shall take one measurement sample on each carrier on the BA list (BCCH Allocation specifying the BCCH channels the MS shall listen to) and one sample on the own BCCH carrier for each paging block reception. The maximum number of measurements per second is 200.

It is recognised that the requirement for GPRS has to be higher than for circuit switched operation because of the nature of operation. The current cell re-selection measurement requirement, however, does not take into account the different DRX periods that MS may have and thus the optimum performance in terms of measurements per second with respect to average power consumption is not achieved. The MS receives paging blocks (PB) from the BS which the MS listens to to find out whether there are transmissions coming to it from the BS. The period between two consecutive PBs is called a DRX period (discontinuous reception). During the DRX period the MS may power itself down as it is not expecting paging messages from the network. The DRX mode is permitted at all other times in idle mode except while performing the cell selection algorithm. The length of the DRX period may vary from time to time, and the MS receives a parameter from the BS on basis of which the MS can calculate when it is to expect PBs, and as the MS is synchronised with the BS it knows exactly when the PBs are coming.

It is possible that in packet idle mode a MS receives several paging blocks (PB) during a multiframe, the requirement of measurements per multiframe can be several times the number of monitored carriers. In practice this means that the upper bound of the current GPRS solution, namely 200 measurements/s, will be reached easily. When the DRX period is very short power consumption increases unnecessarily because of "too many" idle-mode cell re-selection measurements.

SUMMARY OF THE INVENTION

An object of the present invention is to disclose a method of improving operation in view of cell re-selection measurements, preferably in idle-mode cell re-selection measurements in GPRS.

In GSM circuit switched operation the number of measurements is dependent of the number of monitored carriers (BGCHs). In practice this means that in relation to the length of the DRX period the number of measurements is always substantially constant, namely seven measurements. Also in the currently existing proposal for GPRS the number of measurements is fixed in relation to the DRX period, whereby with a short DRX period the number is unnecessarily high increasing current consumption, and with a very long DRX period the number is too low whereby an accurate measurement result is not received often enough. According to the present invention it has been recognised that prior solutions for making cell re-selection measurements fail to take the length of the DRX period into account. Accordingly the present invention proposes to have the number of cell re-selection measurements depend upon the length of the DRX period, i.e. on how often PBs are sent to the MS. The number can vary either based on an equation having linear or non-linear relationship, or alternatively a fixed number of measurements can be specified in such way that for a shorter DRX period the number of measurements is lower and for a longer DRX period the number of measurements is higher. By this proportional relationship is meant that there is a substantial variation in the number of measurements upon a substantial change in the length of the DRX period. This is a clear difference to prior art, in which the number of measurements is substantially constant on different DRX period lengths.

According to a first aspect of the invention there is provided a method of controlling cell idle-mode re-selection measurements in a mobile station in a mobile communication system comprising base stations where a base station defines a cell, and a mobile station for communicating with at least one base station, in which method when the mobile station is in idle mode, the mobile station monitors paging messages coming from the base station informing the mobile station of possible transmissions to come, the paging messages arrive at certain intervals, the interval defining a discontinous reception period (DRX period), and the mobile station performs cell re-selection measurements on certain channels, characterized in that the number of cell re-selection measurements is proportional to the length of the DRX period, whereby during a longer DRX period a higher number of cell re-selection measurements is performed than during a shorter DRX period.

According to a second aspect of the invention there is provided a mobile station for a mobile communication system comprising base stations where a base station defines a cell, and the mobile station comprises communication means for communicating with at least one base station, control means for controlling the communication of the mobile station, reception means as part of the communication means for receiving paging messages, when the mobile station is in idle mode, from the base station informing the mobile station of possible transmissions to come, the paging messages have been arranged to arrive at certain intervals known to the control means, the interval defining a discontinous reception period (DRX period), and measurement means for performing cell re-selection measurements under control of the control means on certain channels when the mobile station is in idle mode, characterized in that the control means has been adapted to control the number of cell re-selection measurements to being proportional to the length of the DRX period, whereby the control means is adapted to control a higher number of cell re-selection measurements to be performed during a longer DRX period than during a shorter DRX period.

By the definition monitoring paging messages (Paging Blocks, PBs) is meant reception of PBs, or at least a trial to receive a PB. Thereby a DRX period is defined by two consecutive PBs which are intended for the particular MS, not dependent upon whether the actual reception of each such PB is successful or not.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
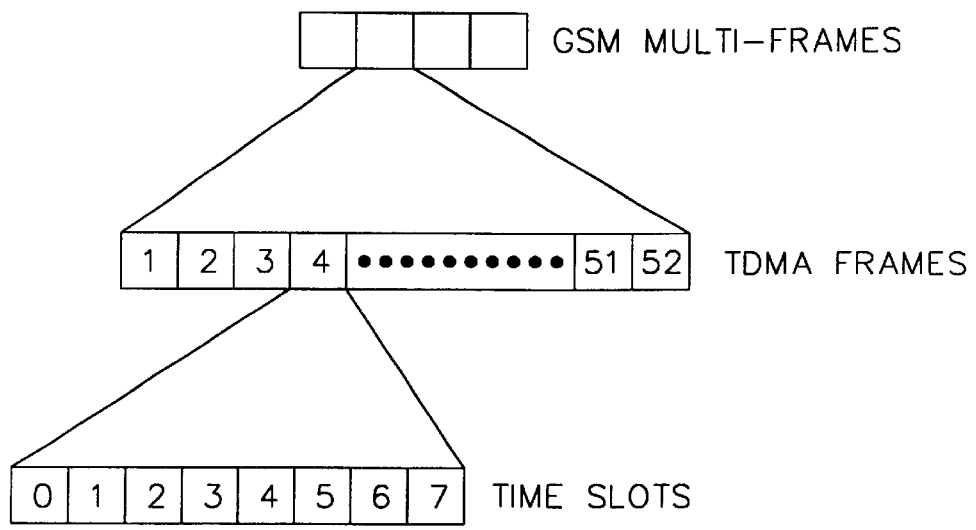
FIG. 1 shows the division of a GPRS multi-frame into 52 TDMA frames and the division of a TDMA frame into eight time slots.
Figure 3:
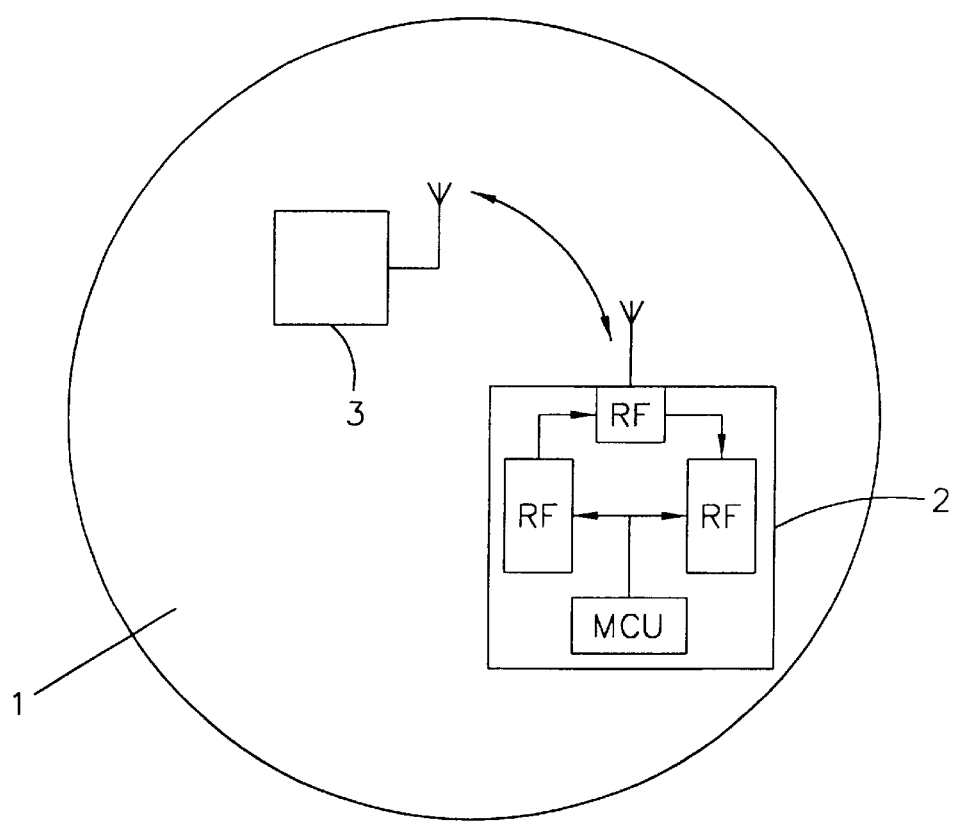
FIG. 3 shows schematically a GSM mobile telephone network and a mobile station in communication with the network.
Figure 2:
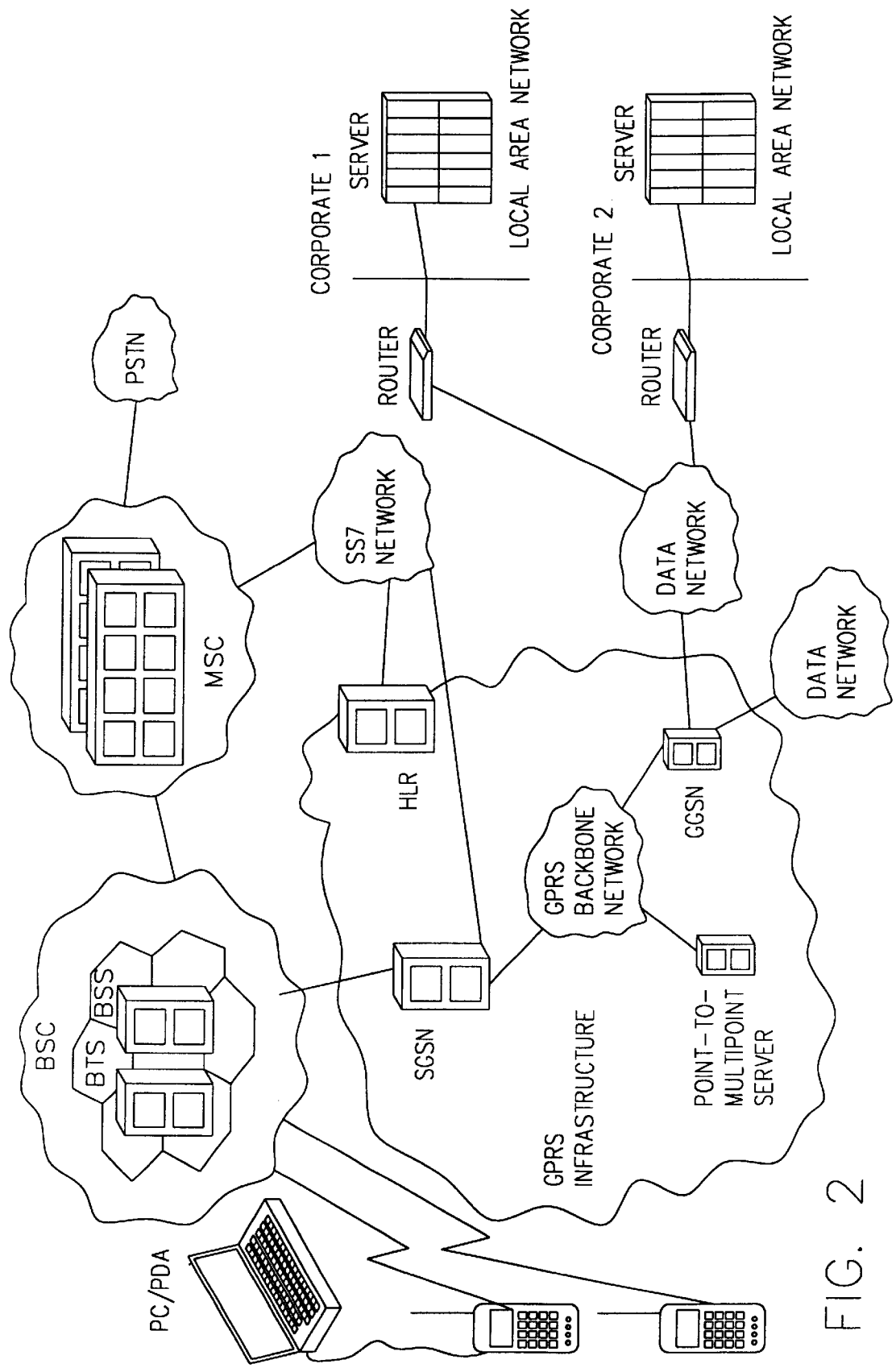
FIG. 2 shows schematically the architecture of a GSM/GPRS digital cellular telephone network.

The mobile station according to the invention may be implemented as is shown in FIG. 3. Basically the cell re-selection measurements are performed by the reception branch RX, which in practice is implemented by a DSP (Digital Signal Processor). The performing of a cell re-selection measurement is as such known and thus it is not necessary to discuss that. The invention is more concerned with the control of performing a measurement, i.e. how often a measurement is performed. This is done by the master control unit (MCU) of the MS. The MCU accordingly implements the method of the present invention so that the MCU controls the reception branch RX to perform cell re-selection measurements so that the number of cell re-selection measurements is proportional to the length of the DRX period, whereby for a longer DRX period a higher number of cell re-selection measurements is performed than for a shorter DRX period. The measurement can be performed at the same time as a Paging Block (PB) is received. The measurement can also be performed at other times, e.g. during the DRX periods, but preferably the measurement is performed when receiving a PB in order to maximise the power-down time during the DRX period.

Figure 4:
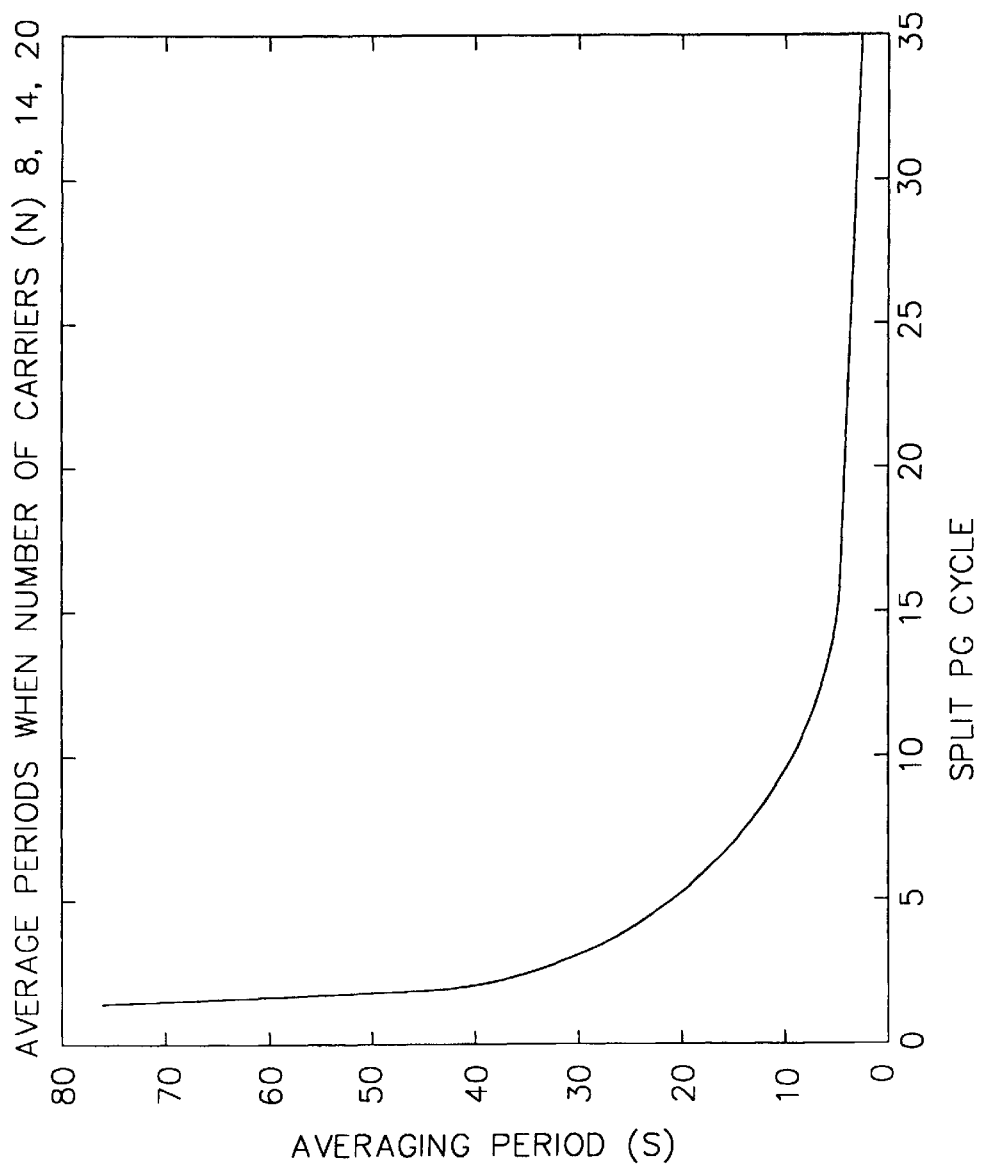
FIG. 4 shows the measurement performance achieved with a prior art solution according to the current GPRS specification.

In comparison FIG. 4 shows the length of the averaging period in relation to a parameter (described below) reflecting DRX period length in the prior art solution as presently suggested in the GPRS specification. From FIG. 4 it can be seen that for low parameter values (meaning for long DRX periods) the averaging period becomes very high, up to 80 seconds, which is a very big (too big) interval to get valid cell re-selection measurement results. This might endanger reliable communication for the MS.

In following one embodiment of controlling the number cell re-selection measurements dependent on the DRX period is described. In the embodiment a parameter SPLIT_PG_CYCLE is used which reflects the number of paging blocks (PBs) per multiframe, and accordingly attaches the number of measurement samples required for each paging to the length of the DRX period of the MS. Thereby a low value for parameter SPLIT_PG_CYCLE means a long DRX period, and a high value for parameter SPLIT_PG_CYCLE means a short DRX period.

In this embodiment the number of required measurements for a paging block reception (i.e. for a DRX period) is derived from the following formula:

$$\text{Max}\{48/\text{SPLIT\_PG\_CYCLE}, 9*\text{Max}\{1-\text{SPLIT\_PG\_CYCLE}/256, 0.45\}\}$$

As can be seen according to this equation the number of measurements is (at least partially) directly proportional to the length of the DRX period (although for some values the number remains constant). According to the formula the number of required measurement samples for five longest DRX periods (1<=SPLIT_PG_CYCLE <=5) will be 48, 24, 16, 12, 10 respectively (rounded to the nearest integer). This helps with the previously mentioned problem with long DRX periods. It should, however, be noted that this may also mean taking more than one sample per carrier for one paging block reception. Thus it would be advisable that a MS would take the samples belonging to the same carrier as far as possible from each other.

When 6<=SPLIT_PG_CYCLE <=350 the number of required measurements varies between 9 and 4, in order to decrease power consumption but at the same time keep the measurement capabilities significantly better than in circuit switched operation.

Figure 5:
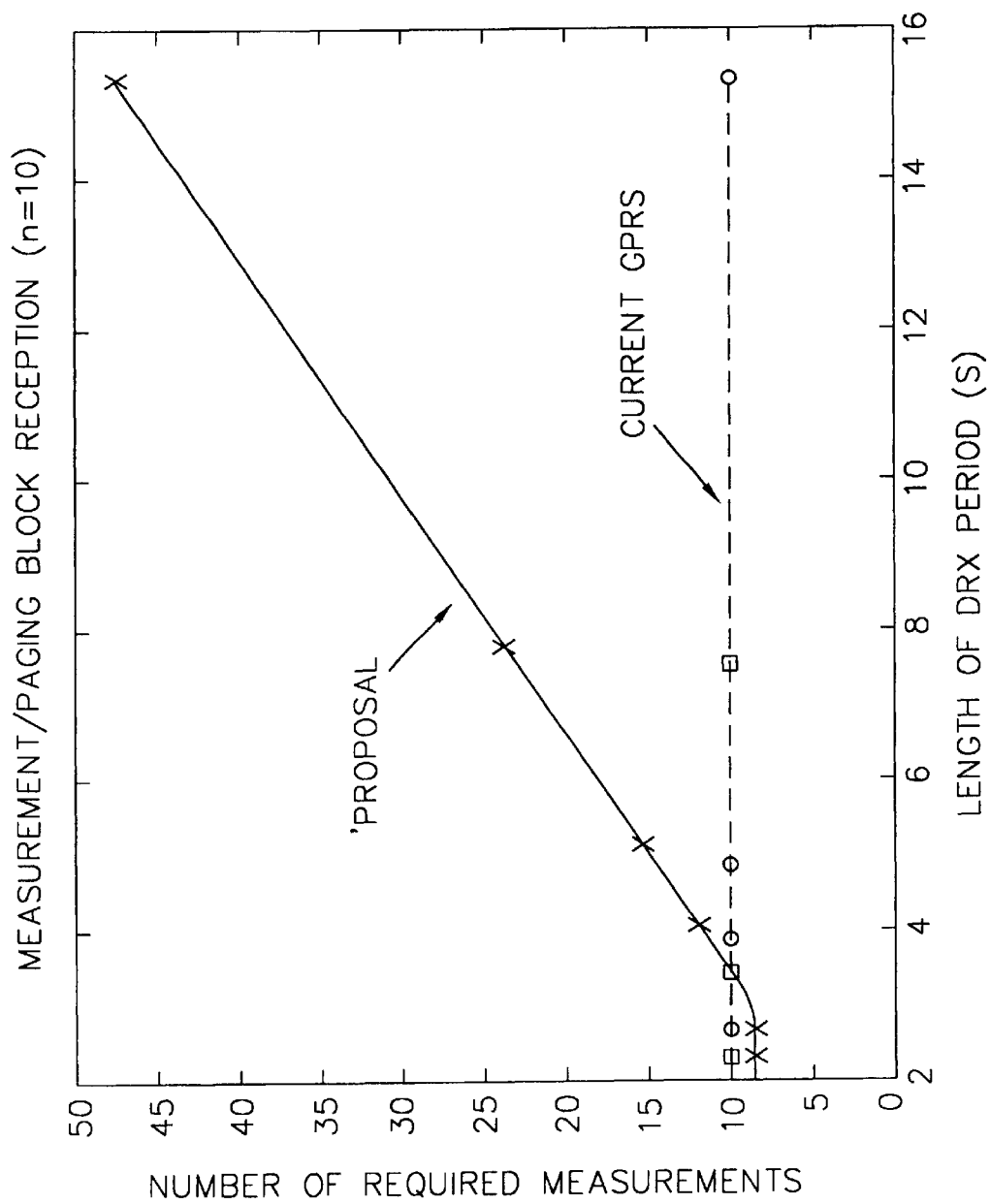
FIG. 5 shows the number of measurements in relation to the length of the DRX period for DRX period lengths more than 2 seconds.
Figure 6:
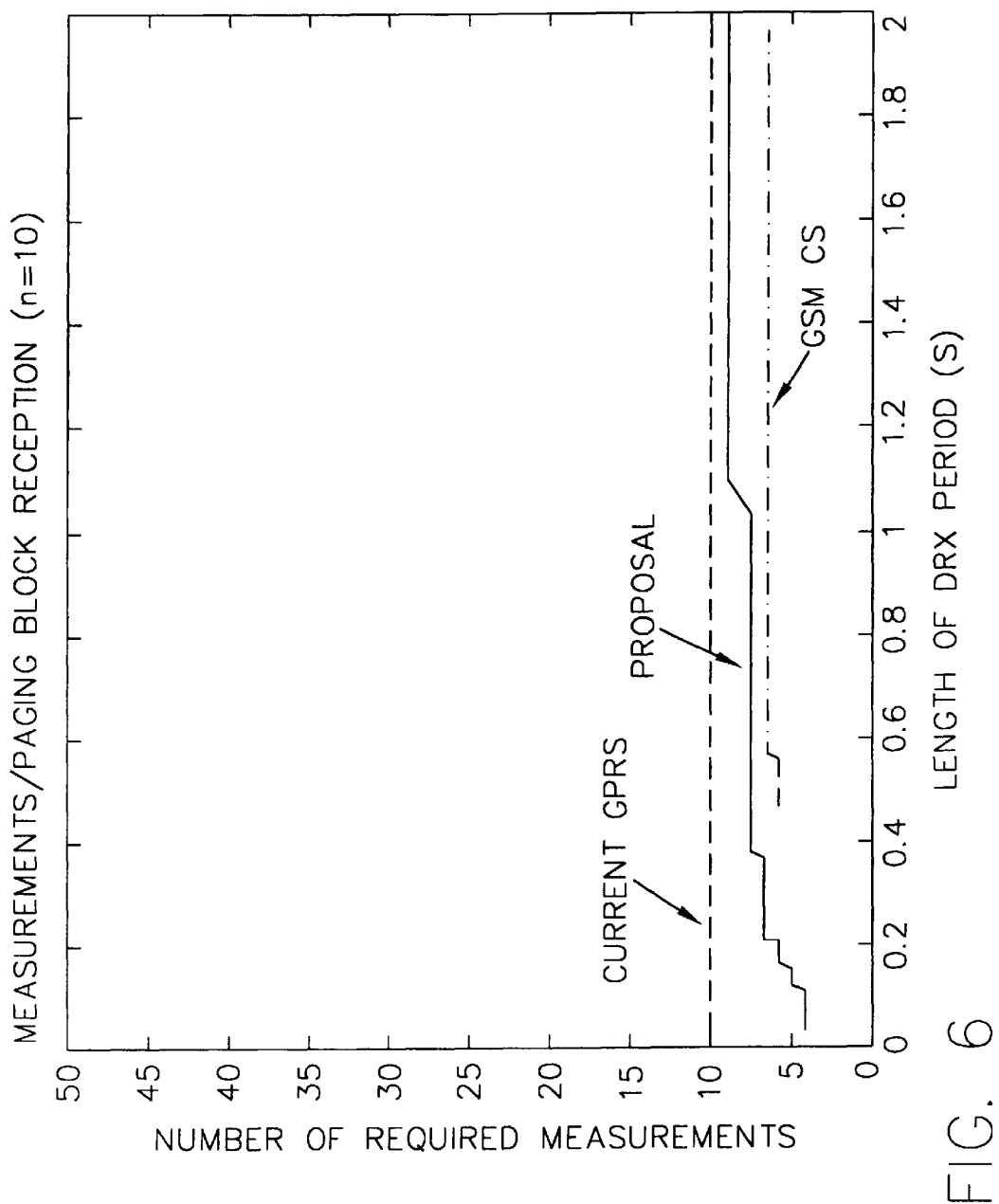
FIG. 6 shows the number of measurements in relation to the length of the DRX period for DRX period lengths less than 2 seconds.

In FIGS. 5 and 6 the number of measurements with respect to the length of the DRX period are shown, whereby curve Proposal shows the figure according to the present invention and Current GPRS shows the figure for the solution that has been proposed for GPRS earlier. FIG. 5 shows the number of measurements for DRX periods more than 2 seconds long and FIG. 6 shows the number of measurements for DRX periods less than 2 seconds long. FIG. 6 also shows, for the sake of comparison, the figures achieved with the prior art solution according to the solution in circuit switched GSM that is in use. This is shown by curve GSM CS, which shows that the number of measurements in relation to DRX period also in that prior art solution are substantially constant since the solution has not considered the problem that the present invention suggests to solve. The number of carriers to be monitored is 10. As can be seen the prior art solution, shown by curve Current GPRS, does not take the length of the DRX period into account, whereby the number of measurements in relation to the length of the DRX period is constant. According to the present invention (in the embodiment defined by the formula above) the number of cell re-selection measurements is dependent upon the length of the DRX period, as can be seen from curve Proposal in FIGS. 5 and 6.

Figure 7:
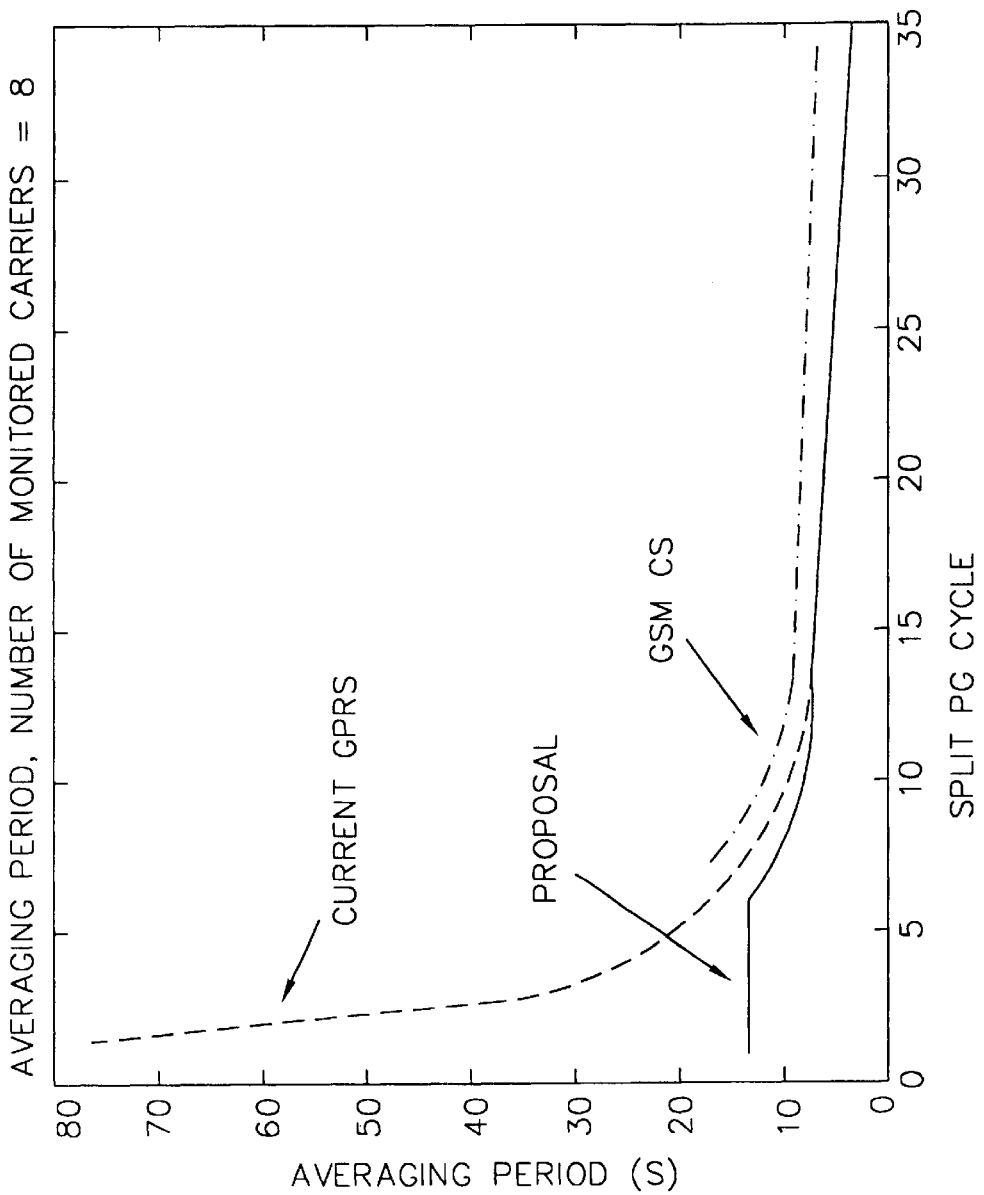
FIG. 7 shows the measurement performance achieved with an embodiment of the invention compared to the current GPRS specification and to the GSM circuit switched system with the figures for the averaging period in relation to a parameter reflecting the DRX period.
Figure 8:
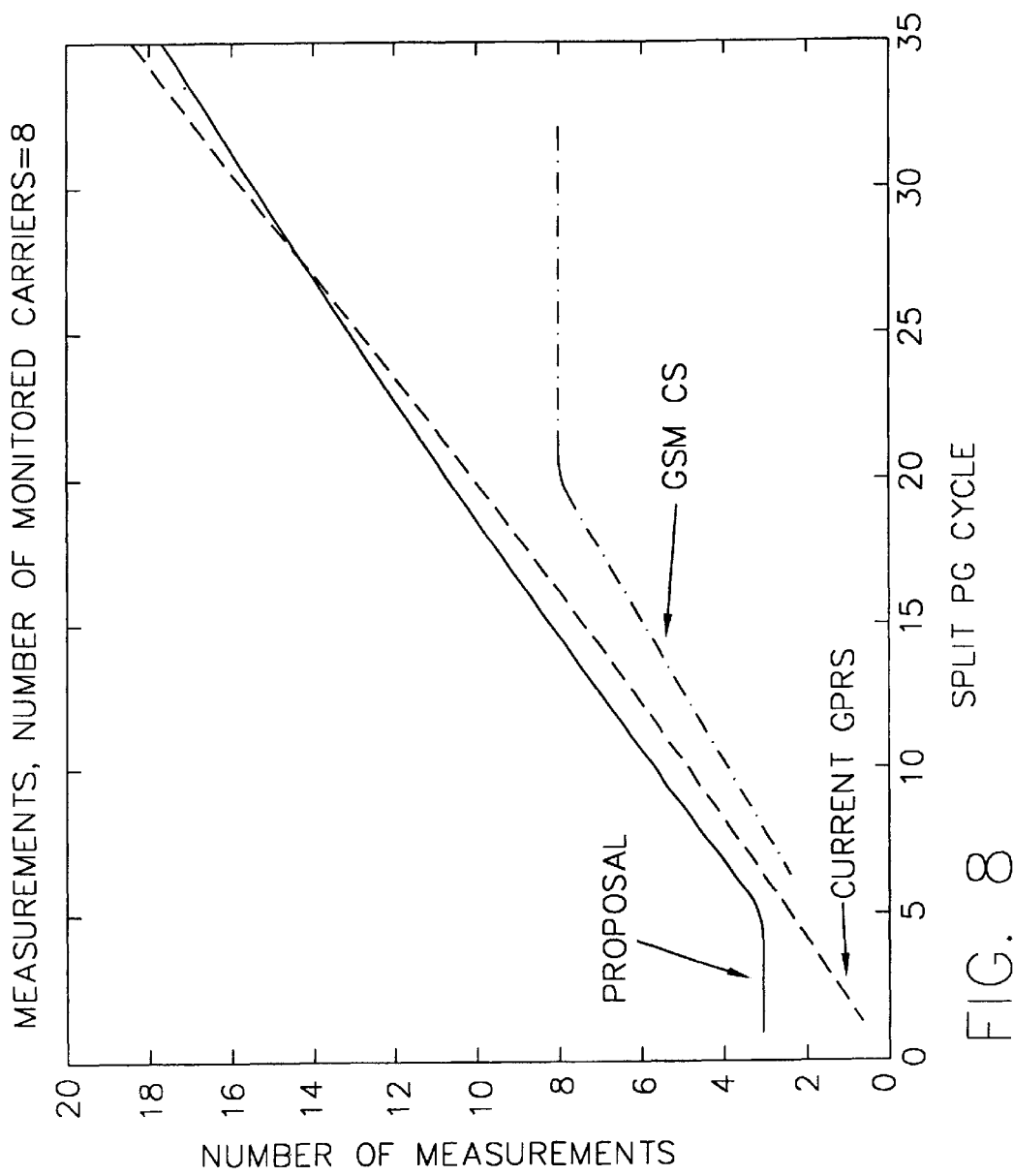
FIGS. 8 shows the measurement performance achieved with the above formula compared to the current GPRS specification and to the GSM circuit switched system with the figures for measurements per second in relation to a parameter reflecting the DRX period.

The constant parameters in the formula are example values and by changing them the requirements can be changed. FIGS. 7 and 8 show the measurement performance achieved with the above formula compared to the current GPRS specification and to the GSM circuit switched system. The performance measures are the number of measurements per second and the averaging period i.e. the period needed for a valid measurement result (5 samples). FIG. 7 compares the averaging period when SPLIT_PG_CYCLE <35 and the number of monitored carriers is 8. Note, that the values according to the Circuit Switched GSM solution, shown by curves GSM CS system are only calculated when 7<=SPLIT_PG_CYCLE<=32. FIG. 8 shows the number measurement per second with the same parameters.

Figure 9:
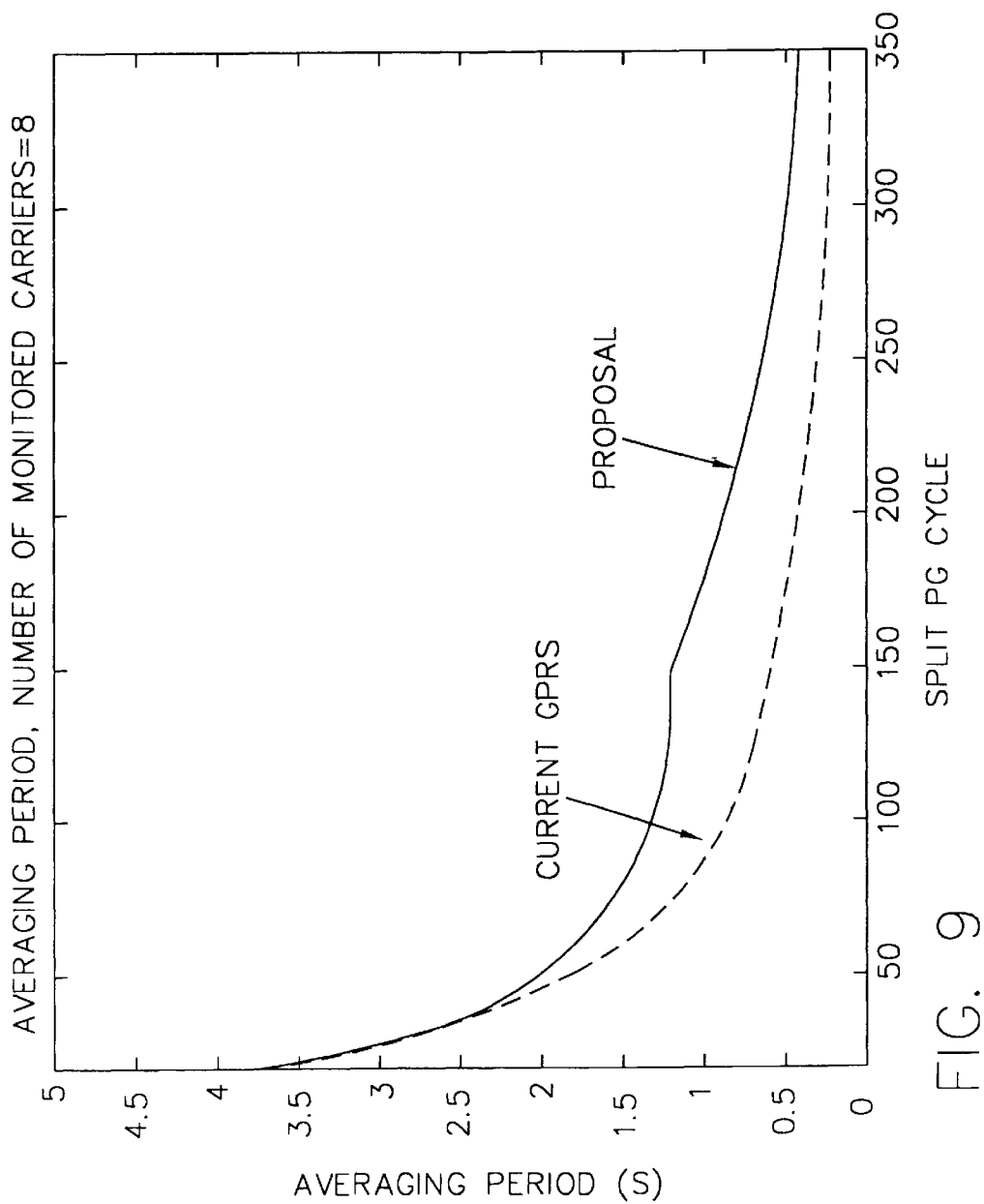
FIG. 9 shows a similar equation as FIG. 7 with different parameter values.
Figure 10:
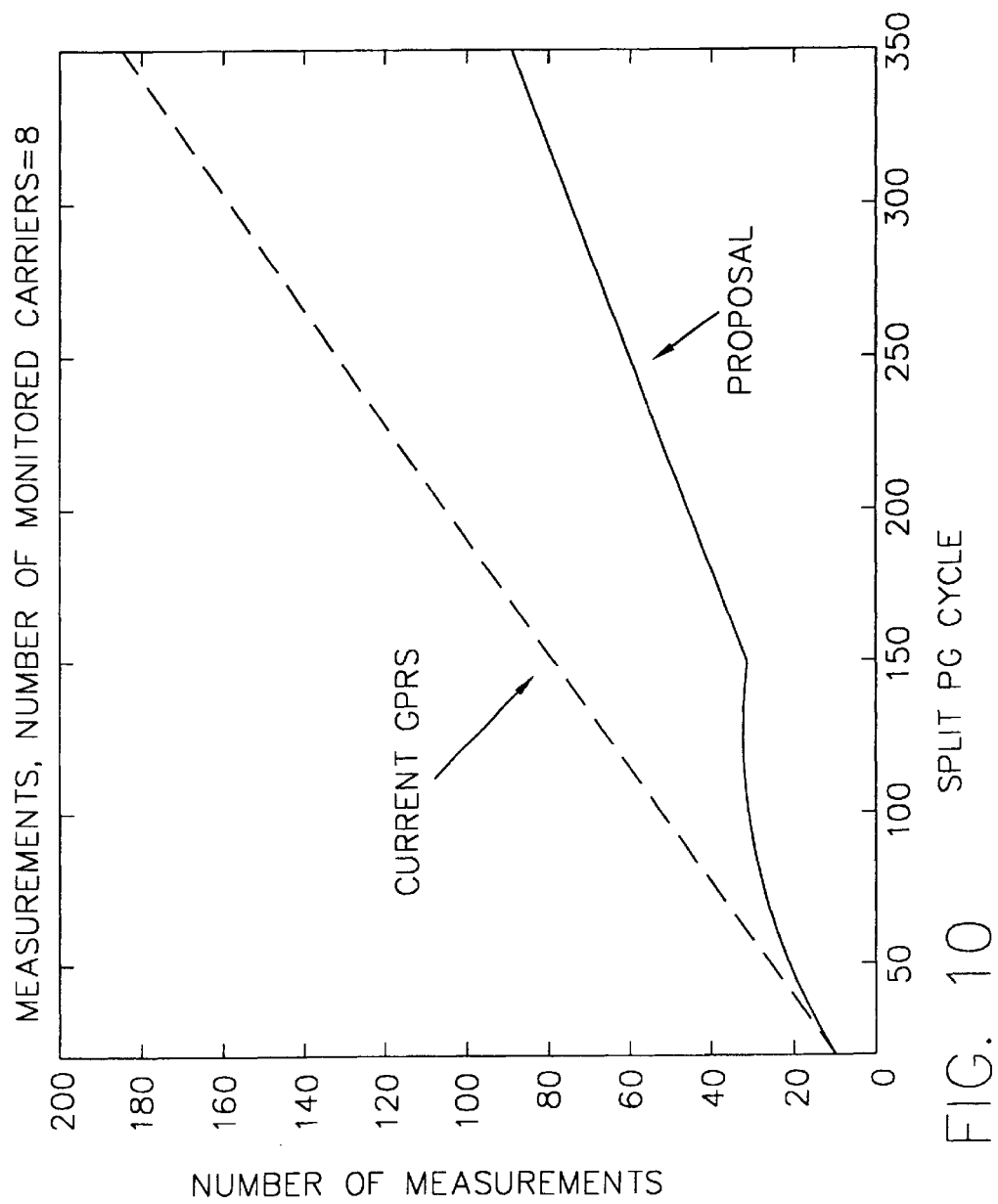
FIG. 10 shows a similar equation as FIG. 8 with the same parameter values as in FIG. 9, and FIGS. 11, 12, 13 and 14 show similar equations as in FIGS. 7–10, but for a different number of monitored carriers.
Figure 11:
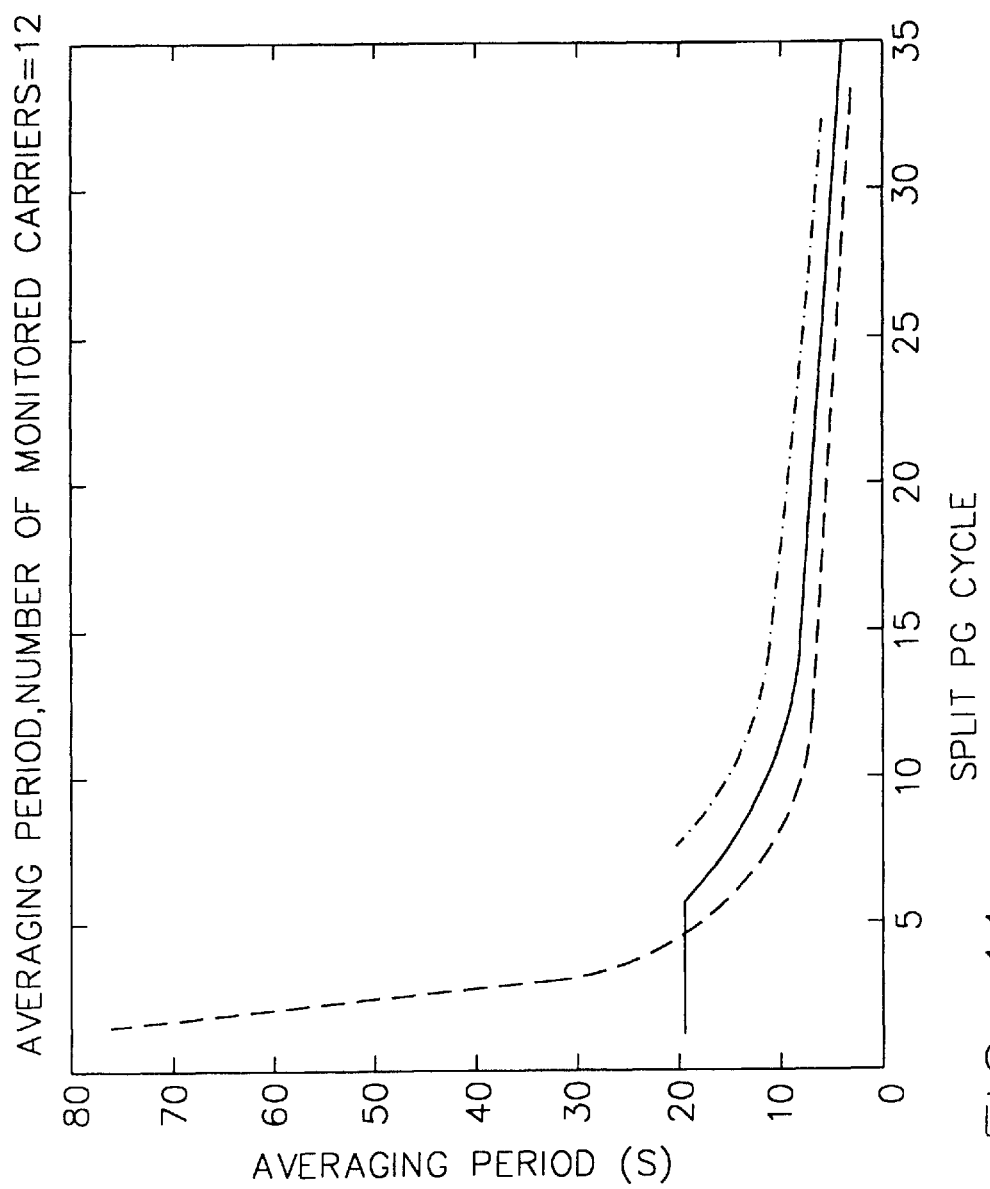
Figure 12:
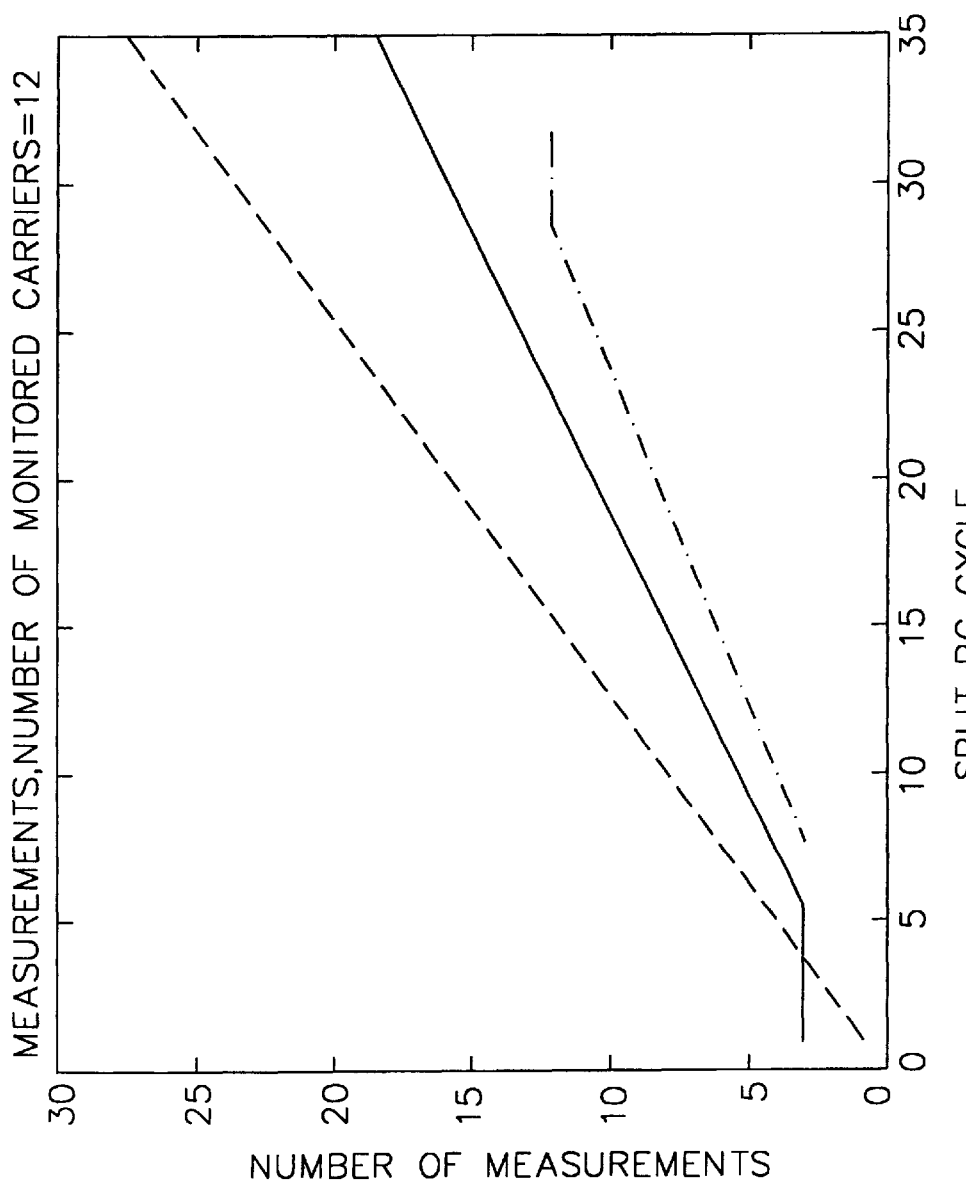
Figure 13:
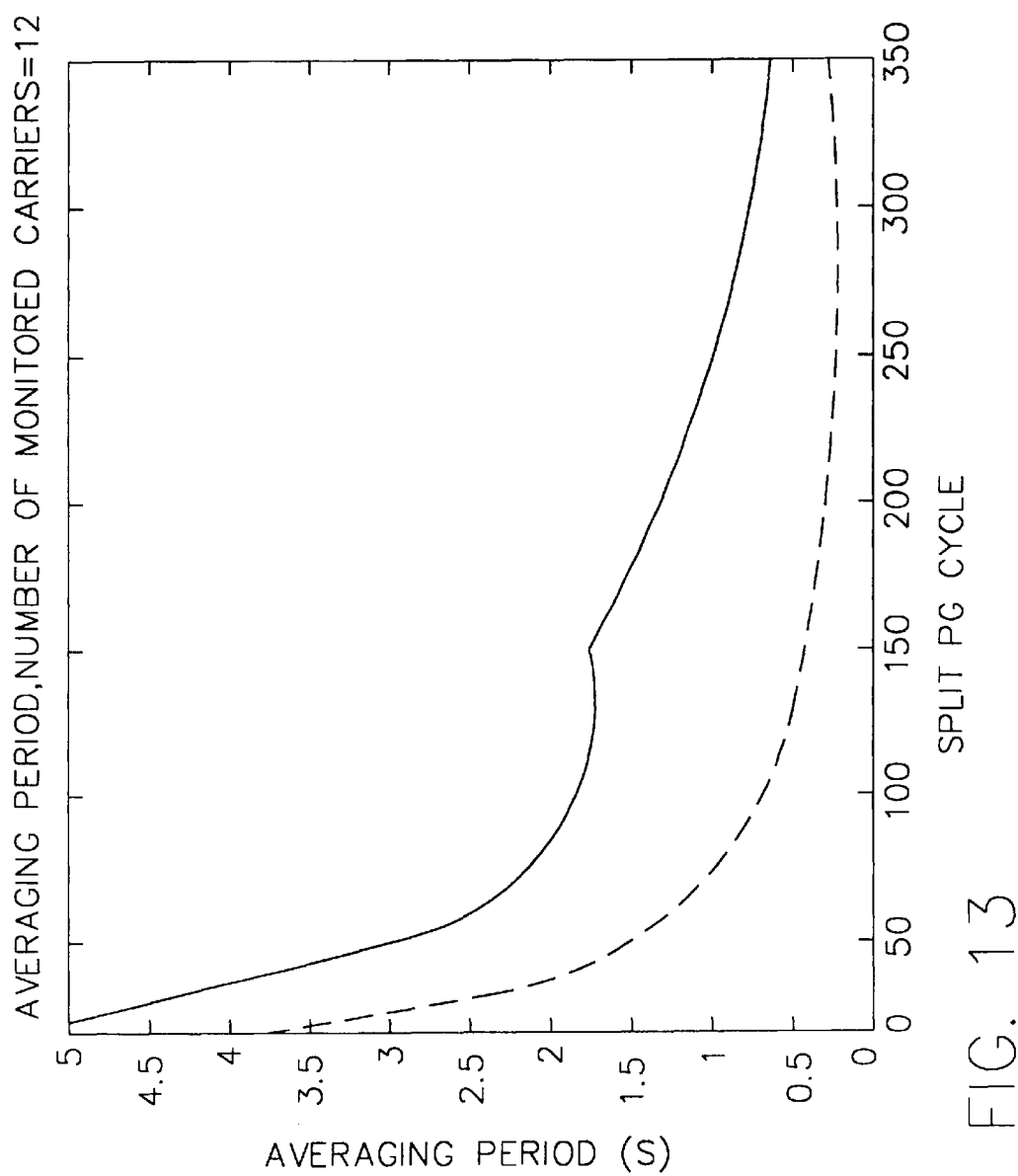
Figure 14:
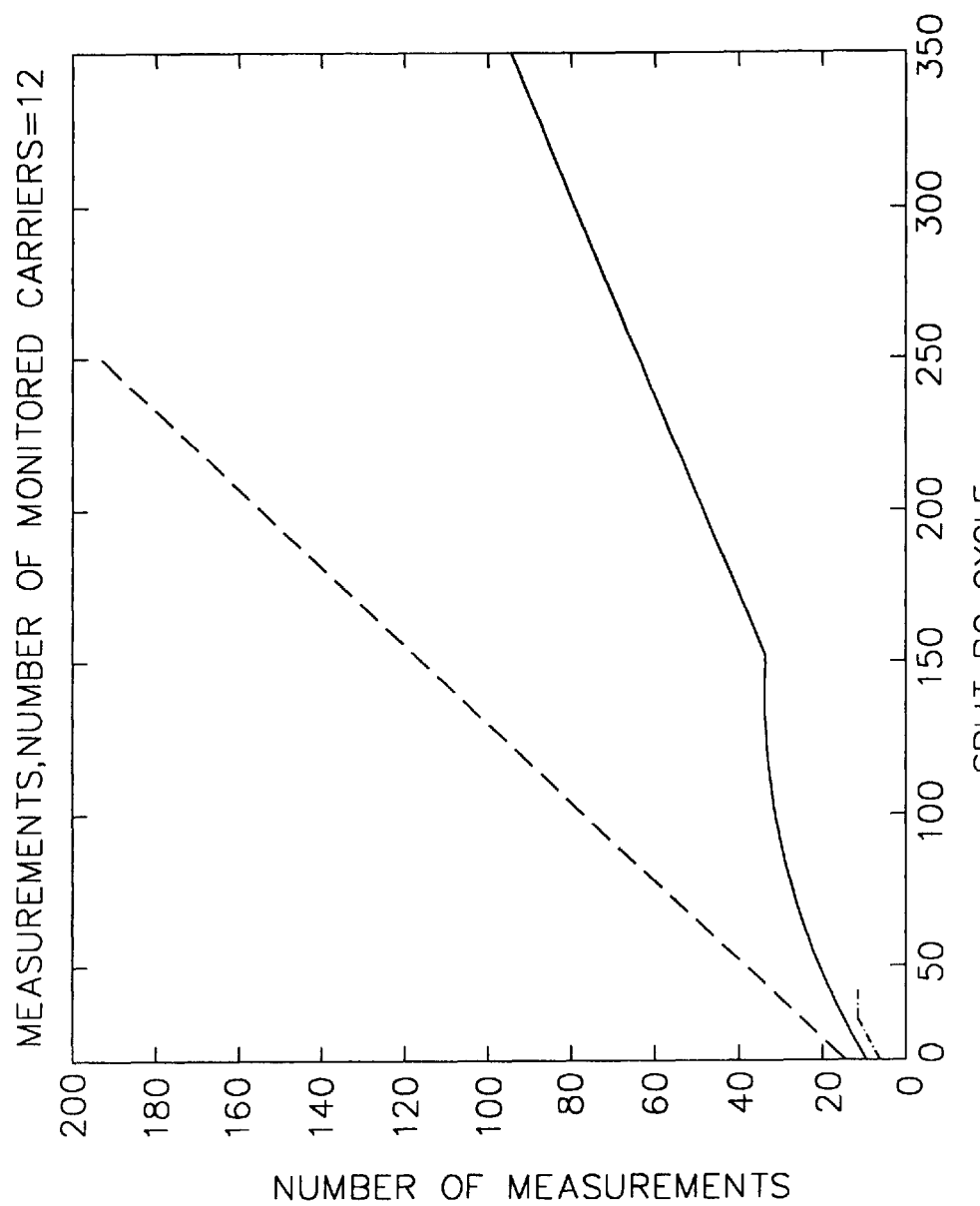

FIGS. 9 and 10 show the same measures when 20<= SPLIT_PG_CYCLE <=350. The results show that although the performance of the Current GPRS is better with short DRX periods there is no significant difference in the length of the averaging period. Using the method according to the invention (Proposal) the number of measurements per second with short DRX periods is near 100 at maximum, which is also a significant improvement compared to the circuit switched operation (GSM CS).

FIGS. 11–14 show the same results when the number of carriers to be monitored is 12. The performance of the Current GPRS is better for short DRX periods, but it should be considered whether averaging periods under 0.5 s are needed in the idle mode operation, since this means also increased power consumption. On the other hand the most significant difference can be seen with long DRX periods. In all FIGS. 7–14 the complete lines show the Proposal, i.e. the present invention, the dashed lines show the Current GPRS, i.e. the prior GPRS solution, and the dashed lines with dots in between show the GSM CS, i.e. the solution that is in use in the existing circuit switched GSM network.

In addition to the formula shown, other formulas could be used, e.g. Max {64/(SPLIT_PG_CYCLE+1), 8*Max{1-SPLIT_PG_CYCLE/256, 0.5}}. The relationship between the number of measurements and length of the DRX period shall be proportional, i.e. for a longer DRX period a higher number of measurements. This could be a linear relationship (as shown in FIG. 5) or a non-linear, and can change in steps (as shown in FIG. 6). Also instead of having a formula or equation (stored in the memory of the MCU) there could be stored a list or look-up table with fixed numbers of measurements for different DRX period lengths. The presented formula and other embodiments may be programmed into the MCU (or into its memory). Accordingly the invention may be implemented in several ways within the scope of the invention.

As has been described and as can be seen from the figures the present invention improves the performance of the MS in connection to making idle-mode cell re-selection measurements in relation to prior known solutions.

What is claimed is:

1. A method of controlling cell idle-mode re-selection measurements in a mobile station (MS) in a mobile communication system comprising base stations where a base station (BS) defines a cell, and a mobile station for communicating with at least one base station (BS), in which method when the mobile station is in idle mode, the mobile station (MS) monitors paging messages (PB) coming from the base station (BS) informing the mobile station of possible transmissions to come, the paging messages (PB) arrive at certain intervals, the interval defining a discontinuous reception period (DRX period), and the mobile station (MS) performs cell re-selection measurements on certain channels, wherein the number of cell re-selection measurements is proportional to the length of the DRX period, whereby during a longer DRX period a higher number of cell re-selection measurements is performed than during a shorter DRX period.

2. A method according to claim 1, wherein the number of cell re-selection measurements is determined by an equation being directly proportional to the length of the DRX period.

3. A method according to claim 2, wherein the equation is non-linear.

4. A method according to claim 3, wherein the number of measurements is Max{48/SPLIT_PG_CYCLE, 9*Max{1-SPLIT_PG_CYCLE/256, 0.45}}, where SPLIT_PG_CYCLE is inversely proportional to the DRX period length.

5. A method according to claim 2, wherein the equation is linear.

6. A method according to claim 1, wherein the number of cell re-selection measurements is predetermined fixedly in relation to the length of the DRX period.

7. A method according to claim 6, wherein the number of cell re-selection measurements is determined in a look-up table stored in the mobile station.

8. A method according to claim 1, wherein the cell re-selection measurement is performed at the same time as the mobile station (MS) is receiving a paging message (PB) from the base station (BS).

9. A method according to claim 1, wherein the cell re-selection measurement is performed during the DRX period.

10. A method according to claim 1, wherein the method is performed in a mobile station (MS) operating in General Packet Radio Service (GPRS).

11. A mobile station (MS) for a mobile communication system comprising base stations where a base station (BS) defines a cell, and the mobile station comprises communication means (RF, TX, RX) for communicating with at least one base station (BS), control means (MCU) for controlling the communication of the mobile station, reception means (RX) as part of the communication means for receiving paging messages (PB), when the mobile station (MS) is in idle mode, from the base station (BS) informing the mobile station of possible transmissions to come, the paging messages (PB) have been arranged to arrive at certain intervals known to the control means (MCU), the interval defining a discontinuous reception period (DRX period), and measurement means (RX) for performing cell re-selection measurements under control of the control means (MCU) on certain channels when the mobile station (MS) is in idle mode, wherein the control means (MCU) has been adapted to control the number of cell re-selection measurements to being proportional to the length of the DRX period, whereby the control means is adapted to control a higher number of cell re-selection measurements to be performed during a longer DRX period than during a shorter DRX period.

* * * * *